Aug. 21, 1934.  R. E. NEWELL  1,970,969
TEMPERATURE RESPONSIVE MECHANISM
Filed June 13, 1932    2 Sheets-Sheet 1
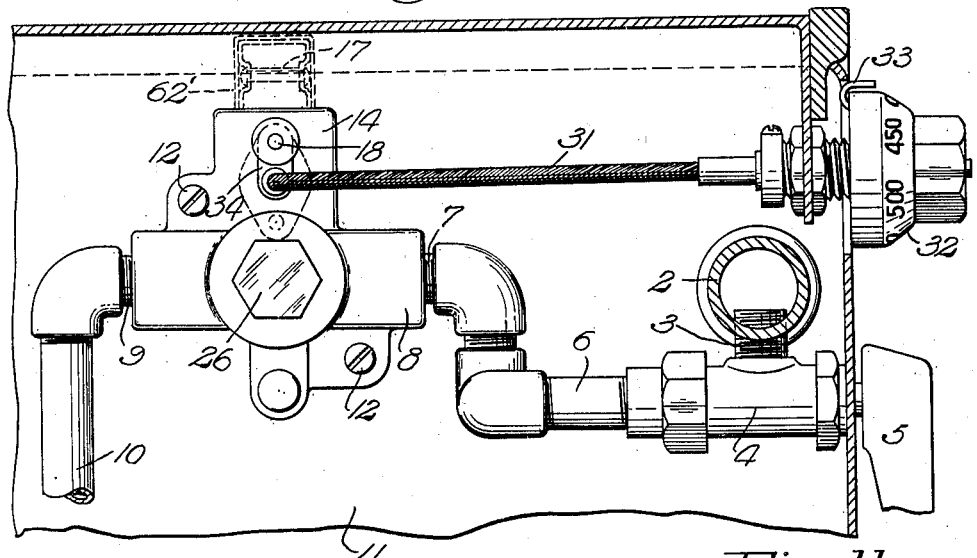
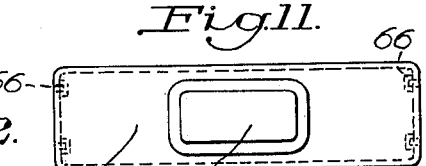
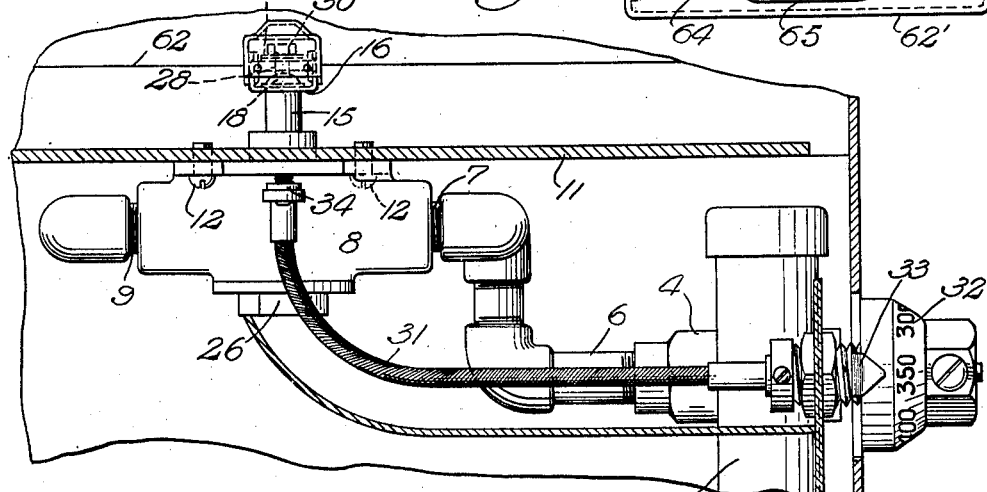
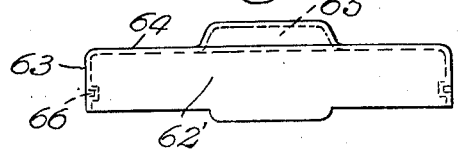
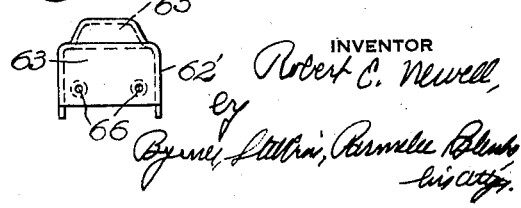

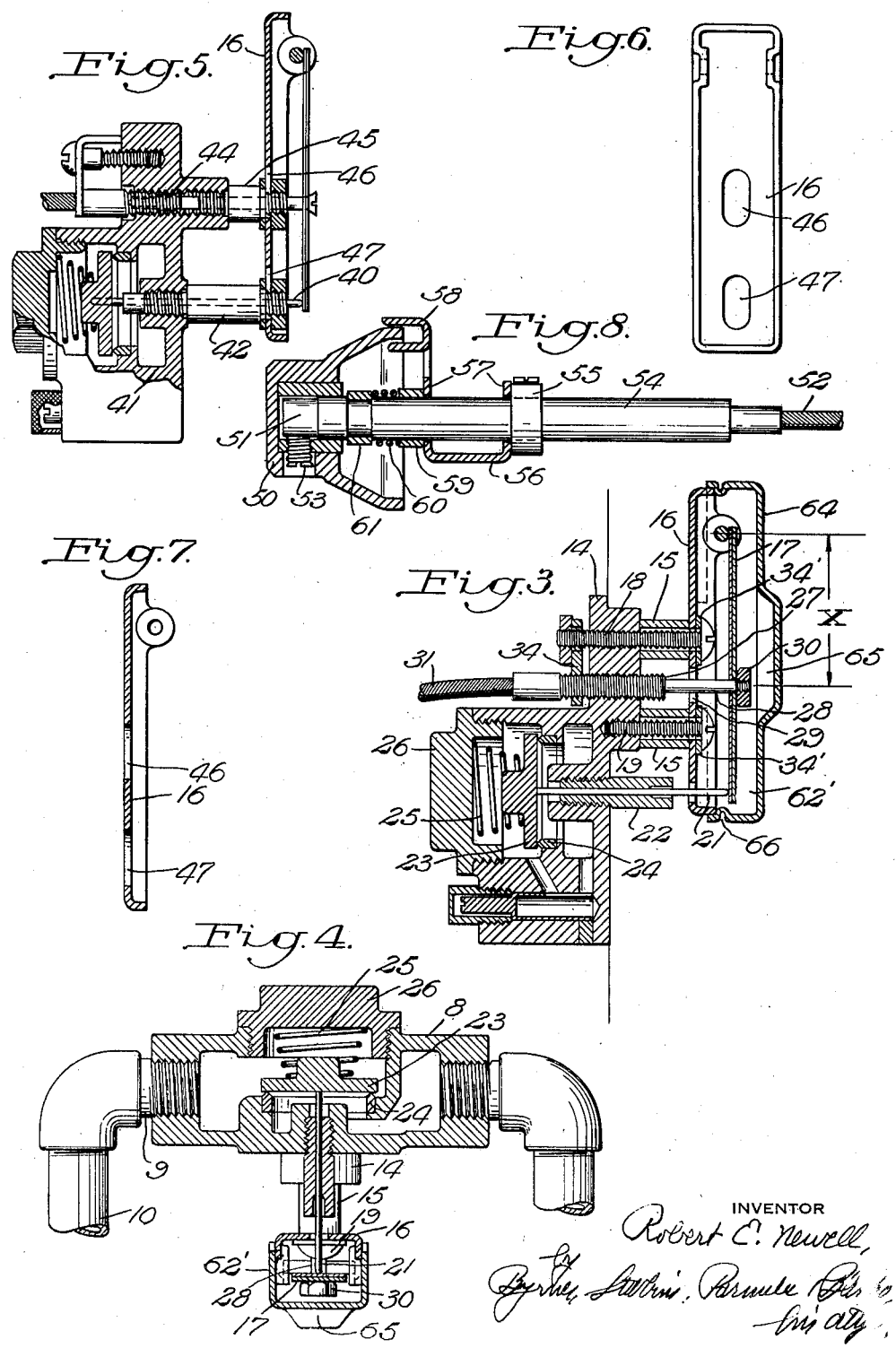

Patented Aug. 21, 1934

1,970,969

UNITED STATES PATENT OFFICE 1,970,969

TEMPERATURE RESPONSIVE MECHANISM

Robert E. Newell, Irwin, Pa., assignor to Robertshaw Thermostat Company, Youngwood, Pa., a corporation of Pennsylvania Application June 13, 1932, Serial No. 616,791

17 Claims. (Cl. 236—15)

The present invention relates broadly to the art of temperature responsive mechanisms, and more particularly to an improved valve structure of the type adapted to be utilized for the control of oven temperatures generally. More especially the invention relates to an improved type of thermostat adapted for use on domestic gas ranges, the thermostat having as a control member a bi-metallic strip flexing in response to temperature variations and effecting the desired operation of the valve.

While bi-metallic elements have heretofore been proposed in place of the more common rod and tube type thermostats, the objections incident to their use have outweighed the advantages. It is one of the objects of the present invention to provide an improved structure such that the advantages may be retained and the objections at least to a large extent obviated.

Among the objections, and one of the principal difficulties encountered in the use of bi-metal thermostats may be mentioned the difficulty of heating an oven, for example, to a uniform temperature throughout. In domestic gas ovens, there is often as much as 30 to 60° difference in temperature at different points along the sides, top and bottom of the oven. With the rod and tube type thermostat, it has been possible to so position the parts within the oven that they are subjected to an average temperature condition. With a bi-metal thermostat, however, it has been impossible to place it in the center of the oven or to extend it through an average temperature zone. The result has been that a bi-metallic thermostat constructed for one type of oven has not been satisfactory for another type. This has necessitated separately calibrating the dials for each installation. Inasmuch as the dies for printing dials are expensive, and their proper manufacture requires considerable time, the production of a proper bi-metal thermostat complete for a given stove has heretofore required a very appreciable amount of time.

In accordance with the present invention, this annoying condition is successfully overcome by an improved mounting for the bi-metal whereby the effective length, and consequently the proportional movement of the bi-metallic element is adjustable to suit the temperature characteristics of any stove on which the thermostat may be mounted.

It has also been found by experience, that bi-metal oven thermostats as now utilized are very seriously affected by local heat conditions adjacent the oven. When the thermostat, for example, is placed on that side of the oven adjacent to a burner chamber or cooking top, this effect of local heat is particularly objectionable. It may be assumed for example that the oven is operating at a temperature of 400°, and that the cooking top burners are lighted and have the usual vessels placed thereover. In such cases the radiated and conducted heat reaching the castings on which the bi-metal is suspended will effect an increase in the temperature of such castings, which heat in turn will be radiated upon the bi-metallic element. This causes closing of the valve controlling the supply of fuel to the oven, and keeps such valve closed until the consequent drop in oven temperature is equal to the heat thus brought to the bi-metal from external sources.

In actual practice it has been found that this external heat may be responsible for as much as 85° or more. In any case, to the extent to which the bi-metal is subjected to external heat, accurate control of the oven temperature is impossible. Another of the objects of the present invention is to provide a structure in which the effect of such external heat, which is from a source other than that for heating the oven itself, may be substantially eliminated.

Ordinary rod and tube type valves such as now provided on the market may be operated through a very appreciable temperature range. It has heretofore not been considered possible to provide a bi-metallic thermostat effective through a comparable range. Another object of my invention is to provide for a large temperature range in a single rotation of the dial so that although the maximum temperature at which the device is operative may be, for example, 550° F., it can also operate down to temperatures as low as 60° F. This enables the operator to close the main seat of the thermostat at room temperature and regulate the by-pass flame when the oven is cold, and also to calibrate the thermostat, if necessary, by adjusting the position of the dial at room temperature without the necessity of heating the oven.

Another difficulty with the use of bi-metallic thermostats has been with respect to the accuracy of control obtained with ovens. Not infrequently it is necessary to locate the bi-metallic element directly in a flue space or the like wherein it is subjected to the wiping action of heating gases. In such cases the temperature of the thermostat itself has been raised to such an amount as to effect a cutting off of the supply of heating medium to the oven even though the oven itself is not up to temperature. Thereafter, the bi-metallic element would become subjected to the oven temperature and in time would reopen the valve and permit continued heating, with a like result to that first described. Thus, there has been an intermittent on and off heating action which has delayed bringing the oven to the desired temperature as quickly as required by standard specifications.

In an effort to obviate this difficulty, efforts have been made to locate the bi-metallic element out of the path of the heating medium, with a result that its temperature has risen too slowly. This in turn has resulted in an "over-shooting" of the oven temperature since the thermostat as to its temperature condition has lagged behind the actual temperature of the oven. In an effort to obviate these objections, it has been proposed to provide a heat baffle for the bi-metallic element whereby it has been subjected to a restricted or limited circulation of the heating medium. This has required a more or less uniform positioning of the thermostatic element in an oven and has not allowed for positioning in accordance with different types of ovens so as to obtain the most satisfactory results.

I have found that if the effect of external heat, by which is meant heat from a source other than that utilized for primarily heating the oven, can be eliminated or minimized, it is possible to accurately control oven temperatures by locating the bi-metallic element in any position. If not directly exposed to circulating gases, it may be freely exposed with the exception of the heat shield positioned between it and the external heat, while if in such position as to be surrounded by circulating gases, it is completely housed. The complete housing is of a distinct advantage in that it prevents deterioration of the bi-metallic element from the constant wiping influence of such high temperature gases.

In accordance with one feature of my invention, I provide a base structure including the heat shield for external heat, and adapted to have a complete enclosing cover applied thereto for protective purposes where it is located in the zone of circulating gases, as for example in the flue of an oven.

In the accompanying drawings there are shown for purposes of illustration only, certain preferred embodiments of the present invention. In the drawings:

Figure 1 is a view partly in vertical section and partly in elevation of one form of installation in accordance with the present invention;

Figure 2 is a view similar to Figure 1, but illustrating the valve as it will appear from a horizontal section;

Figure 3 is a detail sectional view through the valve and bi-metallic control element illustrated in Figures 1 and 2;

Figure 4 is a horizontal sectional view through the valve of Figure 3;

Figure 5 is a view similar to Figure 3, illustrating a slightly modified embodiment of the invention;

Figures 6 and 7 are detail views of the mounting for the bi-metal element;

Figure 8 is a detail sectional view through a modified form of dial assembly; and Figures 9, 10 and 11 are side, end and top plan views, respectively, of an enclosing housing for the bi-metallic element.

Referring first to Figures 1 and 2 of the drawings, there is shown a burner manifold 2 from which a nipple 3 leads to a valve 4 adapted to be manually controlled by a suitable handle 5. With the valve 4 open, gas is adapted to pass from the manifold into the oven burner line 6 communicating with the inlet 7 of a valve casing 8, the outlet 9 of which communicates with a line 10 leading to the burner (not shown). By reference more particularly to Figure 2, it will be noted that the valve casing 8 is secured exteriorly of the oven wall 11 by means of suitable screws 12.

Carried by the valve casing 8 is an extension 14 adapted to be engaged by spacing sleeves 15, preferably of relatively low heat conducting material. These spacing sleeves at their ends remote from the extension 14 are adapted to engage a substantially flat heat shield 16 constituting a mounting for the bi-metallic element 17. The heat shield is held in position by screws 18 and 19 passing through suitable openings in the housing, through the spacing sleeves and into the extension 14.

The bi-metal element 17 rests at one end upon a pin 20 extending transversely of the heat shield 16 in such manner that it forms a fixed rocker bearing for the bi-metal element adjacent one end thereof. The opposite end of the element 17 bears against a gland pin 21 extending through a gland pin bushing 22 and bearing against a valve disk 23. This valve disk is normally urged toward its seat 24 by means of a spring 25, which spring bears at one end against the disk and at its opposite end against a removable cap 26.

Threaded through the extension 14 is a temperature adjusting screw 27 having an extension 28 passing through an opening 29 in the shield 16 and through a second opening in the bi-metal element, the opposite end of the extension 28 carrying a nut 30 contacting the side of the element 17 remote from its shield. Secured to the temperature adjusting screw 27 is a flexible cable 31 leading to a control dial 32 cooperating with a pointer 33.

The parts having been adjusted and calibrated, a clamp clip 34 is applied to prevent loss of the initial setting. When the thermostat is installed, this clamp clip is removed or loosened, leaving the temperature adjusting screw 27 free for rotation as desired by the operator for different temperature conditions. The installation having been made, if the temperature adjusting screw 27 is turned in one direction, it will be apparent that the bi-metal element will be placed under greater tension. If the element is of such construction that the lower end thereof as viewed in Figure 3 is adapted to bow outwardly under increasing temperature conditions, this added tension on the strip will hold the valve disk 23 open until a higher temperature is reached, while if the adjusting screw is turned in the opposite direction, the valve disk will be permitted to close at a relatively lower temperature.

With bi-metal valves at present available on the market, the temperature adjusting screw engages one end of the bi-metallic element. The movement of such element at its free end is so great that it is impractical, on account of tap breakage and the like, to thread the adjusting screw with a thread long enough to take care of more than a 300° F. temperature change. Consequently, the advantages of having a thermostat operative over a 550° range, as before mentioned, cannot be achieved. By placing the adjusting screw near the middle of the bi-metallic element where the movement is less, I am enabled with a twenty-pitch thread to accomplish a temperature range of 600°, whereas by the old style method a sixteen-pitch thread would only accomplish a range of 300°. This ratio does not follow the law of leverage, but, owing to the curved form taken by the bi-metal, the movement varies as the tangents of the arc degrees covered by the movement of the bi-metal at the end and at the point where the temperature adjusting screw is inserted.

From the foregoing description, it will be noted that the shield 16 constitutes merely a heat shield cutting off the bi-metallic element from the effects of external heat, the shield being entirely open on the side adjacent the oven, and on both sides. It is preferably made of a special chromium steel alloy having a heat conductivity of only approximately one-third that of steel, and is highly polished so that it is a good reflector of heat but a poor radiator. In this manner the shield protects the element 17 from the effect of external heat. As a further precaution against conducted heat reaching the housing from the outside, there are utilized the spacing sleeves 15 before described, which sleeves are preferably of poor heat conducting material. The washers 34' disposed beneath the heads of the screws 18 and 19 may likewise be of a poor heat conducting material so that the temperature conditions to which the bi-metallic element is subjected are substantially the true conditions within the zone of the oven within which the element is located.

In order that a given structure may be utilized with different types of ovens, the shield 16 when first made in accordance with one embodiment of my invention preferably does not have any openings punched in its back wall. When a certain style of stove is to be equipped by the manufacturer with this particular thermostat, a test is made on the stove to determine the exact difference in temperature between the center of the oven and the particular spot where the bi-metallic element is to be located. This difference having been determined, the holes are punched in the back of the housing 16 in such manner that the distance $x$ (Figure 3) will be just enough, as determined by previous experiment, to give the bi-metal its correct effective length to compensate for the temperature difference thus determined.

It will be understood that the distance between the temperature adjusting screw 27 and the gland pin 21 remains the same, but by shifting the shield 16 in a direction parallel to the bi-metallic strip, the distance between the temperature adjusting screw and the rocking bearing formed by the pin 20 may be increased or decreased. As this distance is increased, for example, the effective length of the bi-metal is increased, which means that for a given movement of the temperature adjusting screw 27 a corresponding movement of the bi-metal will occur with a smaller difference in temperature, while by decreasing this distance, a greater difference in temperature will be required to effect such a movement.

In this manner, a given dial movement which causes a given valve opening may be made to correspond to a given central oven temperature by increasing the effective length of the thermostatic element if the spot at which the element is placed is cooler than such central oven temperature, and by decreasing its effective length if said spot is hotter than the central portion of the oven. Thus with a dial having a standard temperature scale, or a temperature scale of standard marking, the necessary correction for the temperature difference referred to may be made in the device itself.

In Figure 5 there is illustrated a slightly modified embodiment of the invention. In accordance with this embodiment the gland pin 40 projects outwardly from the valve casing 41 through a combined gland pin bushing and spacer 42 constituting one of the supports for the shield 43. The temperature adjusting screw 44 likewise projects outwardly through a spacer 45 constituting a second mounting for the shield 43.

By reference to Figures 6 and 7, it will be noted that the housing 43 is initially formed with an elongated opening 46 through which the temperature adjusting screw is adapted to project and a second elongated opening 47 through which the combined gland pin and bushing may project. By utilizing such elongated openings the housing may be punched by the manufacturer of the thermostatic valve and then subsequently adjusted in one direction or the other as desired for a particular range. A standard stop gauge for each range may be utilized so that a uniform setting is insured.

In Figure 8 there is illustrated a modified form of dial assembly which may be utilized in place of that shown in Figures 1 and 2. In accordance with this embodiment, there may be provided a dial 50 adapted to be secured to a suitable extension 51 on the flexible cable 52 by means of a set screw 53. Surrounding the extension 51 is a dial stem 54 carrying an adjustable collar 55 for cooperation with a combined pointer and dial stem support 56, which support is constructed to facilitate attachment to any desired part of the stove on which the installation is being made. The combined pointer and support comprises a generally U-shaped body having substantially parallelly extending portions 57 provided with openings for the dial stem.

One of these portions bears against the collar 55 while the other portion extends upwardly to provide a pointer 58 cooperating with the dial 50. Such portion also bears against a spacer 59 engaged by a spring 60 held in position by a spring retaining washer 61. It will be understood that the flexible cable 52, rotatable by means of the dial 50, is connected to a temperature adjusting screw of the character before referred to. While such a screw is preferred by reason of the ease with which it may be adjusted either by close coupled or remote control means, I may replace the screw by other types of adjusting devices if desired.

By reference to Figure 2 of the drawings, it will be noted that the bi-metallic element 17 is located substantially in line with the plane of the inside oven liner 62, while the valve casing 8 is located entirely outside of the oven wall. The approximate lines indicating the outside of the oven wall and the inside of the oven liner have also been indicated in Figure 3. Such a location of the element is desirable since it does not project sufficiently into the oven to interfere with the free use of the oven, and is made possible by reason of the construction and location of the shield which protects the element from external radiated or conducted heat.

Where a location of the bi-metallic element is desired, which may be substantially as illustrated in Figure 2, wherein the bi-metal would normally be subjected to the circulation of the heating gases, I preferably employ therewith a housing as illustrated in Figures 9, 10 and 11. This housing is conveniently made of ordinary steel, chromium plated to prevent corrosion. The cover comprises side walls 62', end walls 63 and a top wall 64. Provided in the top wall is a depression or offset 65 adapted to cooperate with the end of the adjusting screw which extends through the bi-metal. Formed in the end walls 63 are indentations 66 which are adapted to engage the shield 43, for example as shown in Figures 5, 6 and 7, and limit the telescoping action of the housing and shield.

With the housing in position, the bi-metallic element will be completely enclosed so that no circulation of gases there-around is possible, thus preventing it from the deteriorating action of such gases and also guarding it against injury from different utensils placed in the oven. The housing further makes it possible to install the thermostat in any desired position without regard to the question of injury and without limitation as to the character of gases in the zone in which it is to be installed, since in no case is the bi-metal itself exposed either to injury or to the circulating gases. Such a housing further enables the thermostat to be installed in any position, as in a flue way, where the temperature rises materially faster than it does in the oven and where there is a rapid circulation of gases without objectionable cutting on and off of the heating medium as before referred to.

Certain advantages of the present invention arise broadly from the use of a bi-metallic temperature responsive mechanism by reason of the compactness obtainable. Other advantages result from the use of a bi-metallic element which may be mounted in a housing which completely encloses and affords protection not only against radiated and conducted heat from an external source, but also from contact with circulating gases. Further advantages arise from the provision of a shield which is adjustable in such manner that a scale having standard marking may be utilized with different types of ranges.

Still other advantages result from the use of a structure of the character referred to having a stationary rocker bearing for one end with an adjusting means cooperating with the intermediate portion of the bi-metallic element.

Still further advantages result from the use of a thermostatic element situated approximately in line with the inner wall of the oven where it does not interfere with the free use of all portions of the oven, and particularly where such element is housed or shielded by means of low heat conducting material protecting such element from external heat and circulating gases.

While I have herein illustrated and described certain preferred embodiments of the present invention, it will be understood that changes in the construction and arrangement of the parts as well as their characteristic manner of operation, may be made without departing either from the spirit of the invention or the scope of my broader claims.

I claim:

1. A thermostat for ovens, having a thermostatic element located approximately in line with the inner wall of the oven, and a shield of low heat conducting material for protecting said element from external radiated heat.

2. A thermostat for ovens, comprising a bi-metallic thermostatic element located approximately in the plane of an inner side wall of the oven, and a shield of low heat conducting material for protecting said element from external radiated heat.

3. A thermostat for ovens, having a thermostatic element located approximately in line with the inner wall of the oven, and a shield of low heat conducting material for protecting said element from external radiated heat, said shield having a polished highly effective heat reflecting surface disposed toward said element.

4. A thermostat for ovens, comprising a bi-metallic thermostatic element located approximately in the plane of an inner side wall of the oven, and a shield of low heat conducting material for protecting said element from external radiated heat, said shield having a polished highly effective heat reflecting surface disposed toward said element.

5. A thermostat for ovens, comprising a thermostatic element located approximately in the plane of an inner wall of the oven, a body portion exteriorly of the oven, and connecting supporting means between said body and element, said means being of low heat conductivity to reduce the effect of external heat upon said element.

6. A thermostat, comprising a bi-metallic thermostatic element located approximately in the plane of an inner side wall of the chamber the temperature of which is to be controlled, a body portion exteriorly of said chamber, and supporting connections of low heat conductivity between said body and said element.

7. A thermostat, comprising a bi-metal element and shield located approximately in line with an inner side wall of the chamber the temperature of which is to be controlled, a body portion exteriorly of said chamber, and connecting and supporting means of low heat conductivity between said body and said shield.

8. A thermostat, comprising a bi-metal element and shield located approximately in line with an inner side wall of the chamber the temperature of which is to be controlled, a body portion exteriorly of said chamber, connecting and supporting means of low heat conductivity between said body and said shield, and a removable enclosing housing shaped to engage said shield and enclose said element.

9. As an article of manufacture, a valve, a mounting carried by said valve, and a bi-metallic heat responsive element on said mounting for operating said valve, said mounting being adjustable in a direction lengthwise of said element.

10. As an article of manufacture, a valve, a shield carried by said valve, and a bi-metallic heat responsive element on said shield for operating said valve, said shield having a polished heat reflecting surface toward said element.

11. A thermostat, comprising a valve, a stem for moving said valve, a bi-metal thermostat engaging the stem for effecting movement thereof, a rocker bearing for said bi-metal, means for adjusting the effective length of said bi-metal element, and a temperature adjusting means engaging said bi-metal at a distance from the rocker bearing less than the distance between the rocker bearing and the stem.

12. A thermostat, comprising a valve, a stem for moving said valve, a bi-metal thermostat engaging the stem for effecting movement thereof without being secured thereto, a rocker bearing for said bi-metal, means for adjusting the effective length of said bi-metal element, and a temperature adjusting means engaging said bi-metal at a distance from the rocker bearing less than the distance between the rocker bearing and the stem.

13. A thermostat, comprising a valve, a stem for moving said valve, a bi-metal thermostat engaging the stem for effecting movement thereof, a rocker bearing for said bi-metal, and a temperature adjusting means engaging said bi-metal at a distance from the rocker bearing less than the distance between the rocker bearing and the stem, there being a protective low heat conducting housing providing a rocker bearing for said bi-metal.

14. A thermostat, comprising a valve, a stem for moving said valve, a bi-metal thermostat engaging the stem for effecting movement thereof without being secured thereto, a rocker bearing for said bi-metal, and a temperature adjusting means engaging said bi-metal at a distance from the rocker bearing less than the distance between the rocker bearing and the stem, there being a protective low heat conducting shield providing a rocker bearing for said bi-metal.

15. The combination with a chamber the temperature of which is to be controlled, of a valve located exteriorly of said chamber, a bi-metal heat responsive element in said chamber, a housing completely enclosing said heat responsive element, a stem extending into said housing and engaging said heat responsive element for effecting movement of the valve, and means extending into said housing for adjusting said heat responsive element.

16. The combination with a chamber the temperature of which is to be controlled, of a valve located exteriorly of said chamber, a bi-metal heat responsive element in said chamber, a housing completely enclosing said heat responsive element, a stem extending into said housing and engaging said heat responsive element for effecting movement of the valve, and means for adjusting the effective length of said bi-metal element.

17. The combination with a chamber the temperature of which is to be controlled, of a valve located exteriorly of said chamber, a bi-metal heat responsive element in said chamber, a housing completely enclosing said heat responsive element, a stem extending into said housing and engaging said heat responsive element for effecting movement of the valve, means for adjusting the effective length of said bi-metal element, and means extending into said housing for adjusting said heat responsive element for operating the valve stem at a predetermined temperature.

ROBERT E. NEWELL.